(12) United States Patent
Letas

(10) Patent No.: US 8,084,875 B2
(45) Date of Patent: Dec. 27, 2011

(54) WIND ENERGY INSTALLATION WITH AN EXTENDED ROTATION SPEED RANGE

(75) Inventor: Heinz-Hermann Letas, Süsel (DE)

(73) Assignee: REpower Systems AG, Hamburg (DE)

( * ) Notice: Subject to any disclaimer, the term of this patent is extended or adjusted under 35 U.S.C. 154(b) by 629 days.

(21) Appl. No.: 12/170,924

(22) Filed: Jul. 10, 2008

(65) Prior Publication Data
US 2009/0021014 A1 Jan. 22, 2009

(30) Foreign Application Priority Data
Jul. 10, 2007 (DE) .......................... 10 2007 032 179

(51) Int. Cl.
*F03P 9/04* (2006.01)
(52) U.S. Cl. ........................................... 290/44; 322/37
(58) Field of Classification Search .................. 290/43, 290/44, 7, 54, 55; 322/37, 24
See application file for complete search history.

(56) References Cited

U.S. PATENT DOCUMENTS

| | | | | |
|---|---|---|---|---|
| 7,239,036 B2* | 7/2007 | D'Atre et al. | ................... | 290/44 |
| 7,321,221 B2* | 1/2008 | Bucker et al. | ................... | 322/44 |
| 7,423,406 B2* | 9/2008 | Geniusz | ....................... | 318/800 |
| 7,471,007 B2* | 12/2008 | Bucker et al. | ................... | 290/44 |
| 7,518,256 B2* | 4/2009 | Juanarena Saragueta et al. | ............................... | 290/44 |
| 7,531,910 B2* | 5/2009 | Flottemesch et al. | ........... | 290/44 |
| 7,605,487 B2* | 10/2009 | Barton et al. | ................... | 290/44 |
| 7,652,387 B2* | 1/2010 | Corcelles Pereira et al. | ... | 290/44 |
| 7,755,209 B2* | 7/2010 | Jones et al. | ..................... | 290/44 |

* cited by examiner

*Primary Examiner* — Nicholas Ponomarenko
(74) *Attorney, Agent, or Firm* — Morrison & Foerster LLP

(57) ABSTRACT

A wind energy installation includes a wind rotor, a double-fed asynchronous generator driven by the wind rotor, a converter provided with a first part on the generator side connected to a rotor and a second part on the network side connected to a stator of the generator, and a control device providing converter regulation. A mode selector can be switched between a normal operating mode and a reduced voltage operating mode, in which the excitation of the generator is reduced compared to the normal operating mode. The under-excitation produces an additional reactive current, thus reducing the rotor voltage. The rotor voltage can be limited even when the load is high and the network frequency or voltage is incorrect. The usable rotation speed range of the wind energy installation can be extended to provide a more powerful generator with a higher rating, without changing the converter.

21 Claims, 3 Drawing Sheets

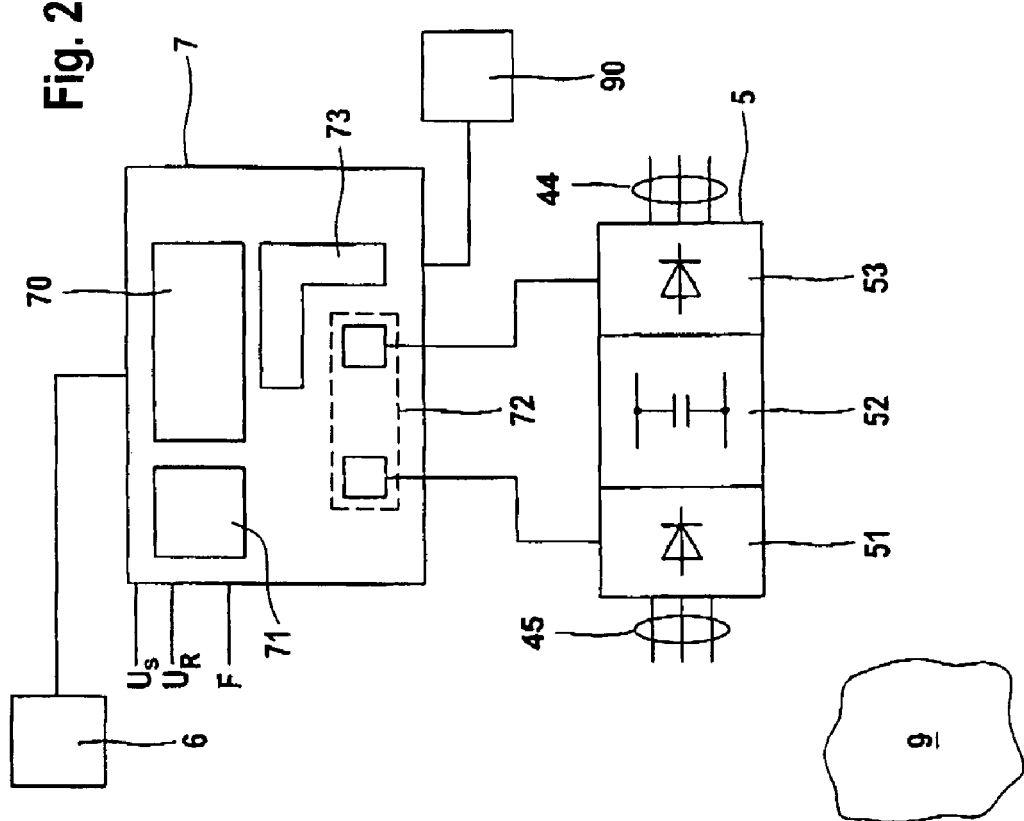
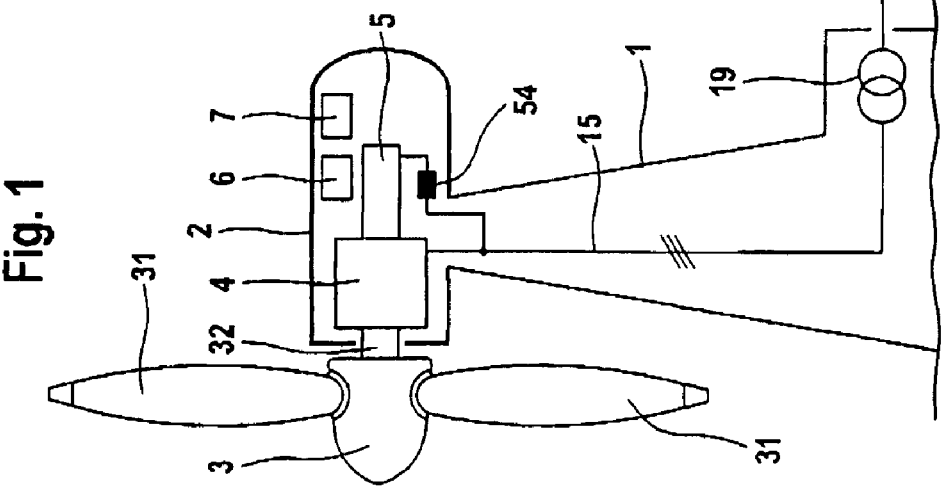

WIND ENERGY INSTALLATION WITH AN EXTENDED ROTATION SPEED RANGE

CROSS REFERENCE TO RELATED APPLICATION

This application claims the priority of German Patent Application No. 10 2007 032 179.3 filed Jul. 10, 2007, the contents of which are incorporated herein by reference.

FIELD OF THE INVENTION

The invention relates to a wind energy installation having a wind rotor, a double-fed asynchronous generator driven by the wind rotor, and a converter for feeding electrical power into a network, with a part on the machine side of the converter being connected to a rotor, and a part on the network side being connected to a stator of the double-fed asynchronous machine, and with a control device with converter regulation being provided, which regulates the converter on the basis of predetermined parameters in a normal operating mode.

BACKGROUND OF THE INVENTION

Modern wind energy installations, in particular those in the relatively high power classes in the Megawatt range, are designed to operate at variable rotation speeds. This means that the rotation speed of the wind rotor can be matched to the respectively prevailing wind conditions by adjustment of the rotor blade pitch angle. While a low rotation speed is selected at low wind speeds, a high rotation speed is correspondingly selected at high wind speeds. With a constant torque in the rotor shaft between the wind rotor and the generator, this means that, the higher the rotation speed is, the higher the power that is transmitted and therefore also the yield of the wind energy installation. One difficulty is that specific maximum and minimum rotation speeds must be complied with because of limiting parameters in the wind energy installation. With regard to the rotor voltage of the generator, the restriction is that the voltage must not become higher than the maximum AC voltage which can be produced by the converter even on reaching the maximum (or minimum) rotation speed. Conventionally, the electrical step-up ratio of double-fed asynchronous machines is therefore chosen as appropriate. This makes it possible to ensure that the rotor voltage is appropriate for the converter limit values during operation. However, it has been found that the step-up ratio that is required per se is no longer feasible for very high-power generators. This is particularly true when wind energy installations are retrofitted. In order nevertheless to allow the high power to be transmitted, it is either necessary to replace the converter for one with a higher voltage limit, which is expensive, or to restrict the rotation speed range of the wind energy installation, which narrows the usefulness and therefore the yield of the wind energy installation. One particularly disturbing factor in restricting the rotation speed range, which is advantageous from cost viewpoints, is that the remaining rotation speed margin for wind strength fluctuations, in particular for gusts, is lost.

It is known that an undesirable rise in the rotor voltage when the network frequency is incorrect can be limited by switching to a different torque/rotation speed characteristic (US 2007/069522 A1). When the load is low, that is to say the rotation speed is below the synchronous rotation speed, the characteristic is shifted to a lower torque so that a new operating point is set at a somewhat higher rotation speed, that is to say closer to the synchronous rotation speed. The generator slip is thus reduced, thus reducing the rotor voltage. In a corresponding manner, when the load is high, that is to say the rotation speed is above the synchronous rotation speed, the characteristic is shifted to a higher torque, thus resulting in a new operating point being selected at a somewhat lower rotation speed. The slip and therefore the rotor voltage are therefore likewise reduced. This known approach has the disadvantage that the torque/rotation speed characteristic is shifted toward medium rotation speeds, thus inter alia reducing the intended maximum rotation speed. The gust margin is thus reduced and the torque load on the drive train also increases.

SUMMARY OF THE INVENTION

The invention is based on the object of improving a wind energy installation of the type mentioned initially such that the rotation speed range can be used without restriction and without any modification to the converter, even for high rating classes.

The solution according to the invention resides in a wind energy installation having the features of the invention as broadly described herein. Further advantageous aspects can be gathered from the embodiments of the invention disclosed below.

In the case of a wind energy installation having a wind rotor, a double-fed asynchronous generator driven by the wind rotor, and a converter for feeding electrical power into a network, with a part on the generator side of the converter being connected to a rotor, and a part on the network side of the converter being connected to a stator of the double-fed asynchronous machine, and with a control device with converter regulation being provided, the invention provides a mode selector which interacts with the converter regulation such that it can be switched between two operating modes, the normal operating mode and a reduced voltage operating mode, in which the excitation of the generator is reduced in comparison to the normal operating mode.

The mode selector allows the invention to act specifically on the converter regulation in order in this way to force the converter to operate in a specific operating mode, to be more precise from one or both inverters in the converter. During operation in the super-synchronous range, that is say at high load, it is possible for at least one of the inverters in the converter to be switched to under-excited operation. In consequence, the inverter produces an additional (inductive) reactive current, which reduces the voltage with respect to the rotor voltage. This makes it possible to prevent rotor voltage limit values being exceeded. Even at high power and thus at a high rotation speed, the wind energy installation can therefore be operated in the super-synchronous mode while nevertheless maintaining an adequate margin for the rotor voltage. The invention means that there is no longer any need to restrict the rotation speed in order to protect the generator or converter against excessively high rotor voltages.

A number of relevant terms will be explained in the following text:

Super-synchronous operation means operation of the wind energy installation at rotation speeds which are higher than the synchronous rotation speed. Synchronous operation is accordingly operation of the wind energy installation at synchronous rotation speed, and sub-synchronous operation is operation at rotation speeds which are lower than the synchronous rotation speed. The latter occurs at low wind speeds, while synchronous operation is chosen as the wind increases, followed by the super-synchronous mode. As is evident from the above, operation at high load takes place in the super-synchronous range.

The invention achieves a number of advantages. On the one hand, the usable rotation speed spectrum is extended while limiting the rotor voltage to specific maximum values. Since the rotation speed limits do not need to be reduced, the rotation speed margin is available to precisely the same extent as in installations of lower rating classes, so that the wind energy installation according to the invention also has correspondingly good gust resistance. In particular, the invention can therefore even be used to upgrade existing wind energy installations, with the generator being replaced by one with a higher rating; the design according to the invention means that there is no need for corresponding and costly replacement of the converter by one with a higher rating. The invention therefore makes it possible to operate a more powerful generator with a converter designed for a lower rating class, and nevertheless to maintain the usable rotation speed range.

A voltage sensor is preferably provided, which determines the voltage present on the stator of the generator and interacts with the mode selector such that the excitation of the generator is reduced as a function of the stator voltage. This allows a voltage drop (the difference between the rotor voltage and the stator voltage) across the generator to be set such that this results in a desired rotor voltage. The rotor voltage can therefore be protected against an undesirable rise, for example resulting from a network voltage or frequency which deviates from the standard value.

It is possible to provide rotor voltage regulation which is expediently designed such that the rotor voltage is regulated at selectable value below the value in the normal operating mode when in the reduced voltage operating mode. This value is referred to as the low value. In this case, a nominal value determining device can be provided, which determines the low value as a function of the stator voltage and/or the network frequency. The invention has identified the fact that the risk of excessive rotor voltages exists in particular in specific constellations with a low network frequency of, for example, 47.5 Hz (in a 50 Hz network) and/or an increased network voltage (approximately from 110% of the nominal value), and requires particularly high reactive-current production for the rotor.

In principle, both inverters, the inverter on the generator side and that on the network side, of the converter can be used for the production of reactive current according to the invention in order to reduce the rotor voltage. It is advantageous to use the inverter on the generator side since it can use the step-up ratio of the double-fed asynchronous machine as a gain factor, and the voltage drop across the generator impedance can also be made use of. However, the additional or alternative use of the inverter on the network side should not be ignored.

Particularly for the network-side inverter, it is advantageous to provide an additional switching module, which switches the inverter on the network side to an under-excited, normally excited or over-excited operating mode. This interacts with the mode selector as described in the following text. In principle, the neutral operating mode is selected whenever the inverter on the network side does not need to produce any reactive current. This operating mode is particularly appropriate for high peak-power situations when no current margin or scarcely any current margin is available in any case. The under-excited operating mode is expediently selected in order to support the desired effect of voltage reduction. This is the case in particular when the voltage reduction of the rotor voltage is intended to be as great as possible. However, a situation can also arise in which the effects on the network to which the wind energy installation is connected should remain as low as possible despite the aim of reducing the rotor voltage as much as possible with the assistance of the inverter on the network side. The over-excited operating mode would then be chosen. In this operating mode, the inverter on the generator side ensures the desired rotor voltage reduction, while the inverter on the network side keeps the effects of the wattless component feed produced by the inverter on the generator side low with respect to the behavior on the network.

The additional switching module preferably interacts with a compensation installation such that the latter supports the network-side inverter during over-excited operation. In particular, this makes it possible to use compensation installations which are available in any case for this purpose, in order to provide the desired inductive wattless component.

Furthermore, the converter regulation can be designed to measure and to monitor the rotor voltage. If the rotor voltage exceeds a predeterminable limit value, the converter regulation activates protective devices, such as a crowbar, in order to reduce the rotor voltage, and therefore protects the generator against damage caused by an excessive rotor voltage.

The invention also relates to a method for operation of a wind energy installation, in which converter regulation switches the converter between a normal operating mode and a reduced voltage operating mode in such a way that the excitation of the rotor of the double-fed asynchronous generator is reduced in comparison to that of the normal operating mode when in the super-synchronous mode with high power (correspondingly high wind strengths). Reference should be made to the above statements for a more detailed explanation.

BRIEF DESCRIPTION OF THE DRAWINGS

The invention will be explained in the following text with reference to the attached drawing, in which one advantageous exemplary embodiment is illustrated, and in which:

FIG. 1 shows a schematic view of a wind energy installation according to one exemplary embodiment of the invention;

FIG. 2 shows a detail view of a converter and converter regulation for the wind energy installation as shown in FIG. 1;

DETAILED DESCRIPTION OF THE INVENTION

Figure 3:
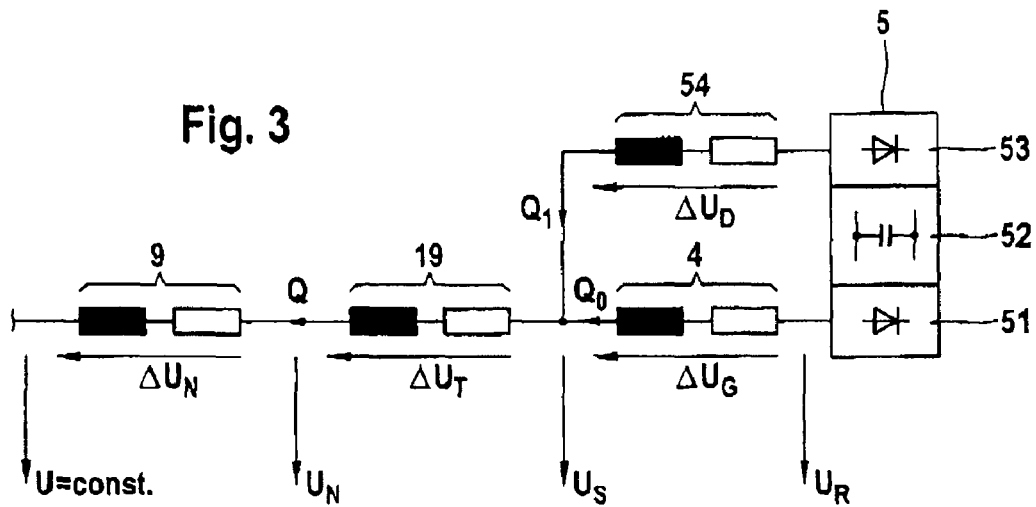
FIG. 3 shows an equivalent circuit of the generator and its connection to a network.

A wind energy installation designed according to one exemplary embodiment of the invention comprises a tower 1 at whose upper end a machine housing 2 is arranged such that it can rotate in the azimuth direction. A wind rotor 3 having a plurality (3 in the illustrated example) of variable pitch-angle rotor blades 31 is arranged on one end face of the machine housing 2. The wind rotor 3 drives a generator 4, which is arranged in the machine housing 2, via a shaft 32. The generator is a double-fed asynchronous generator with a stator and a rotor. A converter 5 and an operation controller 6 for the wind energy installation are also arranged in the machine housing, and the operation controller 6 is connected to converter regulation 7. The latter controls the converters and their inverters and directly selects the electrical parameters for the converter 5. The electrical power produced by the generator 4 in conjunction with the converter 5 is emitted to a network 9 via a line 15 and a medium-voltage transformer 19, which is normally arranged in the base of the tower. The network 9 may be a public transmission grid system or a connecting-line system within the wind farm.

The electrical connection of the generator 4 in conjunction with the converter 5 and its interaction with the converter regulation 7 will be described in more detail in the following text. The double-fed asynchronous generator 4 has a rotor and a stator. The connecting line 15 is connected directly to the stator. The voltage at the stator is therefore governed directly by the network voltage. The rotor of the generator 4, in contrast, is connected to the converter 5. The converter 5 is subdivided into three parts, an inverter 51 on the generator side, an intermediate circuit 52 and an inverter 53 on the network side. The inverters 51, 53 are equipped with preferably fully controllable switching elements, such as GTOs or IGBTs. The inverter 51 on the generator side is connected to the rotor of the double-fed generator 4, and, via the intermediate circuit 52 (which may be in the form of a DC voltage circuit or power circuit), feeds the inverter 53 on the network side, which is in turn connected via an inductor 54 to the connecting line 15.

The converter regulation 7 has a regulation core 70, which operates the switching elements of the inverters 51, 53 on both the generator and network sides. This is done on the basis of reference variables which are applied by the high-level operation controller 6. During normal operation, the inverters are operated such that power flows from the network to the rotor of the generator 4 (sub-synchronous mode), no power flows through the converter 5 (synchronous mode) or, when the generator 4 is producing a large amount of power, electrical power is drawn from the rotor winding of the generator 4 and is fed into the network via the converter 5 (super-synchronous mode). This method of operation of the converter regulation and of the converter is known per se and does not need to be explained in any more detail. This is implemented in the regulation core 70. At its output connections, the regulation core 70 produces control signals which are applied to the inverters 51, 53 on the generator and network sides. According to the invention, the converter regulation defines the appropriate control signals for the inverters both in the conventional manner in a normal operating mode, and also for a reduced voltage operating mode. A mode selector 72 is used to select the operating mode, and transmits the respective signals associated with this to the inverters 51, 53.

The reduced voltage operating mode is intended for operating the inverter 51 on the generator side such that the double-fed asynchronous generator 4 is operated under-excited. This means that additional inductive reactive current is fed into the rotor of the generator 4. This reactive current results in a reduction in the rotor voltage, thus making it reliably possible to prevent the rotor voltage from exceeding the maximum limit values even when on high load and at extreme rotation speeds (minimum or maximum), that is to say such that the rotor voltage in particular does not become greater than the maximum voltage which can be produced by the converter 5. This ensures that, even in extreme situations such as these, the converter 5 can provide regulation as desired, and can thus enforce the desired operating points.

Reference will be made to FIG. 3 in order to explain the method of operation of the rotor voltage reduction according to the invention by feeding in an inductive reactive current. The illustration shows, as concentrated elements, the resistances and reactances of the generator 4, of the network inductor 54, of the medium-voltage transformer 19, as well as the impedance of the network 9, which is assumed to be rigid (that is to say to have a constant voltage). When a wattless component $Q_0$ is additionally fed into the rotor of the generator 4, this makes it possible to increase the voltage drop across the impedance of the generator 4. The rotor voltage $U_R$ is therefore reduced in comparison to the stator voltage $U_S$. This means that, according to the invention, the under-excited mode makes it possible to increase the voltage drop across the generator 4 in the reduced voltage operating mode, and therefore to reduce the rotor voltage $U_R$ as desired.

This effect can be enhanced by the capability to increase the voltage drop $\Delta U_T$ across the impedance of the medium-voltage transformer 19 and the voltage drop $\Delta U_N$ across the impedance of the network, in a corresponding manner, by means of the wattless component $Q_0$ and optionally further wattless component $Q_1$ (with the same mathematical sign) of the inverter 53 on the network side. In this case as well, the process of additionally feeding in a wattless component results in a greater voltage drop, thus correspondingly reducing the stator voltage $U_S$ with respect to the network voltage $U_N$, and thus, taking account of the additional voltage drop $\Delta U_D$ across the inductor 54 and the internal electrical step-up ratio of the generator 4, reducing the rotor voltage further. Overall, this therefore results in a significant reduction in the rotor voltage by additionally feeding in a wattless component Q. Conversely, a wattless component $Q_1$ with an opposite mathematical sign can be generated by over-excited operation of the inverter 53 on the network side, such that this compensates for the wattless component $Q_0$ (entirely or partially) with respect to the network 9.

Figure 4A:
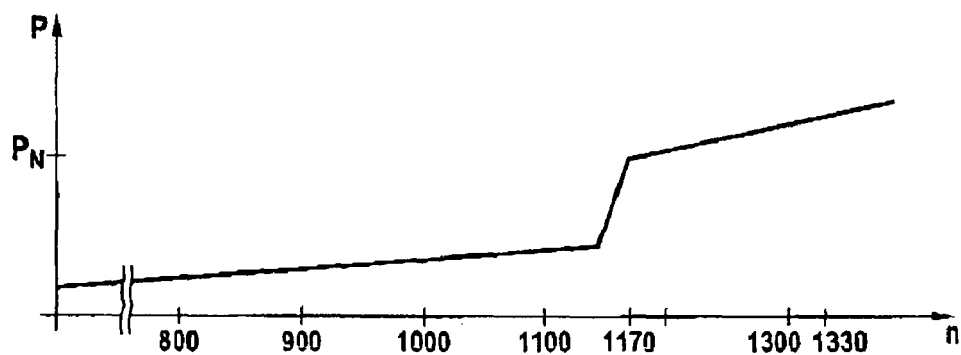
FIG. 4 shows characteristics of the wind energy installation as shown in FIG. 1.
Figure 4B:
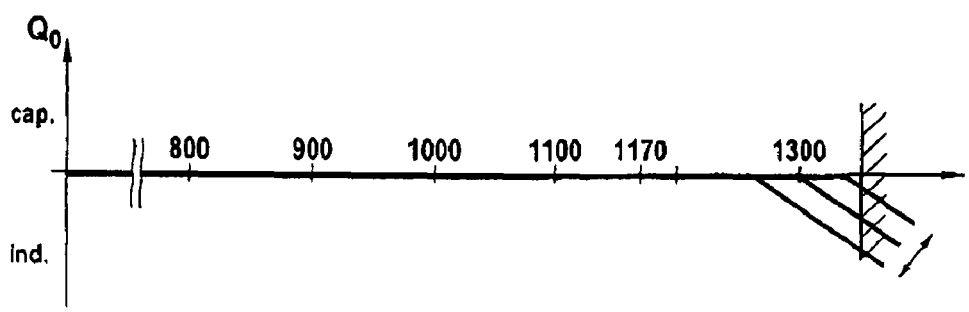

The effect of the under-excitation according to the invention in the reduced voltage operating mode is illustrated in the characteristics in FIG. 4. FIG. 4a shows the generator characteristic as a function of the power P, plotted against the rotation speed of the wind rotor 3. The point at which the rated power is emitted occurs at 1170 rpm. A relatively light wind results in a rotation speed below this, and correspondingly less power is emitted; when the wind is stronger, regulation takes place at the specified rating point at 1170 rpm, and the rotation speed range above this, with correspondingly increased power output, is reached only dynamically during gusts. FIG. 4b correspondingly shows the wattless component being fed in, plotted against the rotation speed. As can be seen, additional reactive current is produced by under-excitation at high rotation speeds. As explained above in conjunction with FIG. 3, this results in a voltage-reducing effect with respect to the rotor voltage. In this case, the operating point from which additional reactive current is fed in can be varied, for example depending on the condition with respect to overvoltage or undervoltage in the network, the network frequency or the wattless component demanded by the operation controller 6.

The reduced voltage operating mode is operated as follows. The mode selector 72, which is connected to the regulation core 70, interacts with a nominal value determining module 71. This has applied to it in each case one input signal for the voltage on the stator winding of the generator 4, which is measured directly by means of a first voltage sensor 44, and for the voltage on the rotor winding, which is likewise determined directly by means of a second voltage sensor 45 or is determined indirectly from a drive signal for a pulse-width modulator for the converter 5, as well as an input signal for the network frequency f, which is determined via a sensor that is not illustrated, or is applied by the operation controller 6. It is also possible to provide for the use of alternative or additional parameters. The nominal value determining module 71 uses predeterminable limit values to determine when to switch from a normal operating mode to the reduced voltage operating mode, and operates the mode selector 72 appropriately. In the reduced voltage operating mode, the mode selector 72 operates the inverter 51 on the generator side such that the rotor of the generator 4 is under-excited. A wattless component is therefore additionally fed into the rotor of the generator 4, thus reducing the rotor voltage. It is therefore possible to regulate the rotor voltage using the excitation of the inverter 51 on the generator side as a manipulated variable, and the network voltage or frequency as a reference variable.

In addition, it is possible to provide for the mode selector to act on the inverter 53 on the network side, by means of an additional switching module 73. This can likewise be operated under-excited, or operated over-excited, or can remain in the neutral mode. The under-excited mode is selected when the voltage reduction is intended to be as great as possible and any reaction on the network will have no or only a minor effect; this mode is particularly appropriate when the aim is to reduce the rotor voltage, as the highest priority. Over-excitation would be chosen when the aim is to keep the effects on the network as minor as possible. In the ideal case, over-excitation is set such that this results in compensation, with the generator under-excited via the rotor, at the network (see FIG. 3). The inductive wattless component $Q_0$ (which is used for voltage reduction) of the generator 4 in this case does not flow, or at least does not completely flow, into the network, but flows as a wattless component $Q_1$ into the inverter 53 on the network side, so that no wattless component Q, or scarcely any wattless component Q, enters the network 9. Although this results in only a minor reduction in the rotor voltage, the wind energy installation, however, has a neutral behavior with respect to the network for this purpose.

Finally, a neutral setting can be chosen when the converter 5 has no further current margin to produce reactive current, that is to say in particular when highly loaded, for example as a result of gusts.

Alternatively or additionally, the additional switching module 73 can be designed to interact with a compensation installation 90. This can be done in such a way that the compensation installation 90 is used specifically to produce reactive current. Since a compensation installation is in general provided in any case, this makes it possible to increase the available wattless components with very little additional complexity. This applies in particular to the operating mode in which the inverter 53 on the network side is operated over-excited.

The characteristics achieved during operation for one exemplary embodiment of the invention are illustrated in FIG. 5. FIG. 5a shows the change in the rotor voltage achieved by feeding in a wattless component, to be precise for various network frequencies. The wattless component that is produced is plotted on the abscissa, with negative values representing an inductive wattless component, that is to say the under-excited mode. The rotor voltage $U_R$ achieved by the wattless component that is respectively fed in is plotted on the ordinate, to be precise for network frequencies of 50.5 Hz and 47.5 Hz. The limit voltage for the rotor voltage is 750 V (dashed line). As can be seen, when a wattless component is fed in according to the invention in the under-excited mode, the rotor voltage can be kept below the limit value even in very poor conditions (network frequency 47.5 Hz).

Figure 5A:
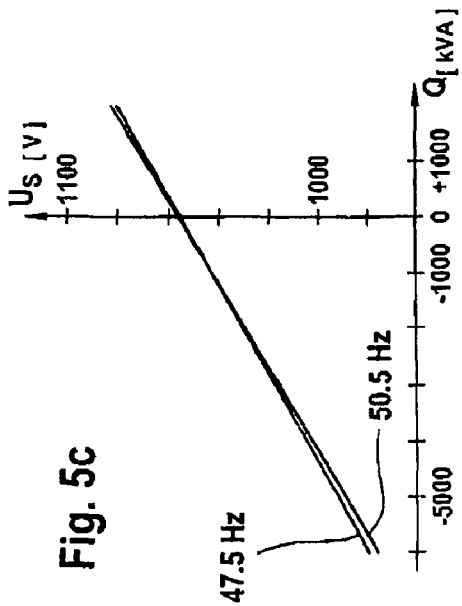
FIG. 5 shows graphs relating to the effect of the invention in various operating conditions.
Figure 5B:
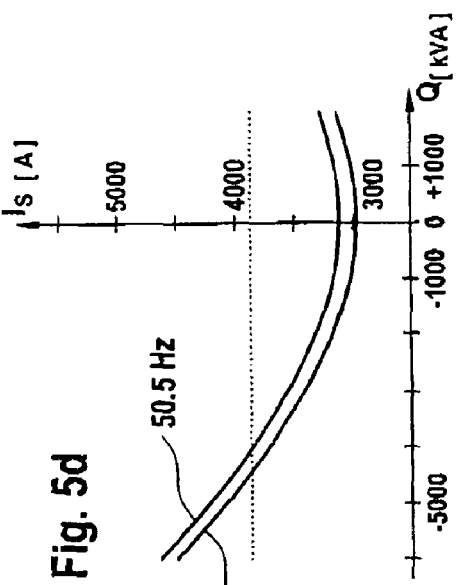
Figure 5C:
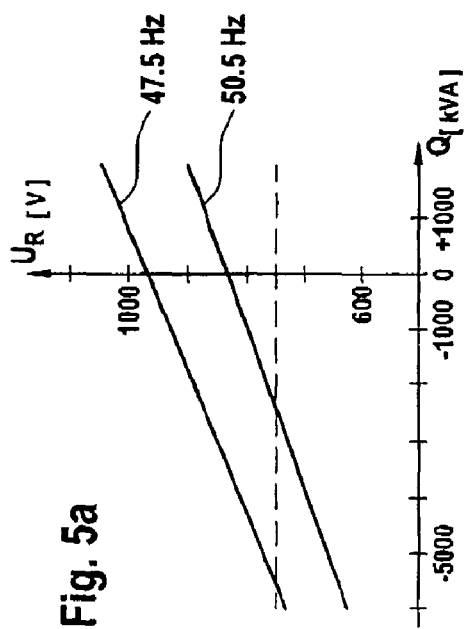
Figure 5D:
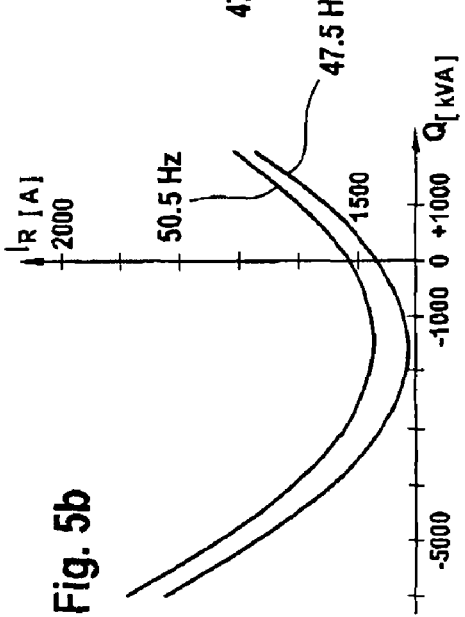

FIG. 5b shows the rotor current $I_R$ plotted against the wattless component Q, in a corresponding manner. As can be seen, the rotor current reaches the lowest values during moderate under-excited operation (wattless component fed in between −500 and −3000 kVA), while the rotor current increases considerably when a greater wattless component is fed in. In a corresponding manner, FIGS. 5c and 5d illustrate the stator voltage $U_S$ and the stator current $I_S$, with the dotted line representing the rated current.

The graphs in FIGS. 5a to 5d relate to a high-load situation in poor conditions, with a rotor rotation speed above the rated rotation speed (1330 rpm in comparison to 1170 rpm) and with the maximum permissible voltage at the connection of the medium-voltage transformer 19 to the network 9, amounting to 110% of the network voltage. As can be seen, even in these extremely poor conditions, the voltages can be kept below the limit values by feeding in a wattless component. This rotation speed range can therefore also be used for high network voltages without a damaging overvoltage occurring on the rotor of the generator 4. Since this rotation speed range is typically reached only during dynamic short-term operation (in particular in the case of gusts), the additional reactive current required to produce the wattless component places scarcely any load on the system formed from the generator 4 and the converter 5, so that short-term high currents can also be tolerated. The invention therefore results in the upper rotation speed range being maintained for operation of the installation even in poor operating conditions, such as an overvoltage in the network. The usable rotation speed range is therefore extended upwards without any need for complex, expensive hardware, resulting from a more powerful converter, for this purpose.

The invention claimed is:

1. A wind energy installation, comprising:
    a wind rotor;
    a double-fed asynchronous generator driven by the wind rotor, the generator comprising a rotor and a stator;
    a converter configured to feed electrical power into a network, the converter comprising
    a first part on a generator side of the converter connected to the rotor and
    a second part on a network side of the converter connected to the stator and the network; and
    a regulator configured to switch the converter between a normal operating mode and a reduced voltage operating mode in order to regulate the rotor voltage,
    wherein in the normal operating mode the regulator operates the converter based on predetermined network parameters, and
    wherein in the reduced voltage operating mode the regulator causes the converter to operate the generator with reduced excitation relative to the normal operating mode in the super-synchronous range.

2. The wind energy installation of claim 1, comprising a voltage sensor configured to determine the voltage present on the stator of the generator and to interact with the regulator such that the regulator causes the converter to operate the generator with reduced excitation as a function of the stator voltage.

3. The wind energy installation of claim 1, wherein, in the reduced voltage operating mode, the regulator regulates the rotor voltage at a selectable low value lower than the value at which the rotor voltage is regulated in the normal operating mode.

4. The wind energy installation of claim 3, wherein the regulator interacts with a device configured to determine the low value as a function of the voltage on the network side of the converter.

5. The wind energy installation of any one of claims 1-4, wherein the first part of the converter comprises a generator-side inverter, and wherein the generator-side inverter is configured to operate the generator with the reduced excitation causing a wattless component to be fed into the rotor to reduce the rotor voltage in the reduced voltage operating mode.

6. The wind energy installation of claim 5, wherein the second part of the converter comprises a network-side inverter, and further comprising a switching module configured to switch the network-side inverter to an under-excited operating mode in which the network-side inverter feeds a wattless component into the stator to reduce the rotor voltage in the reduced voltage operating mode.

7. The wind energy installation of claim 6, wherein the switching module is connected to a compensation installation configured to support the under-excited operating mode of the network-side inverter by feeding an additional wattless component into the stator in the reduced voltage operating mode.

8. The wind energy installation of claim 3, wherein the regulator interacts with a device configured to determine the selectable value as a function of the network frequency.

9. The wind energy installation of any one of claims 1-4, wherein the second part of the converter comprises a network-side inverter, and further comprising a switching module configured to switch the network-side inverter to a neutrally excited operating mode in which the network-side inverter neither feeds a wattless component into the stator nor reduces a wattless component on the network.

10. The wind energy installation of any one of claims 1-4, wherein the first part of the converter comprises a generator-side inverter and the second part of the converter comprises a network-side inverter, and wherein the generator-side inverter is configured to operate the generator with the reduced excitation and the network-side inverter is configured to operate in an over-excited operating mode in which the network-side inverter reduces a wattless component on the network in the reduced voltage operating mode.

11. The wind energy installation of any one of claims 1-4, wherein the second part of the converter comprises a network-side inverter, and wherein the network-side inverter is configured to operate the generator with the reduced excitation causing a wattless component to be fed into the stator to reduce the rotor voltage in the reduced voltage operating mode.

12. A method of regulating a wind energy installation having a double-fed asynchronous generator driven by a wind rotor, the generator comprising a rotor and a stator, comprising:
feeding, using a converter, electrical power into a network; and
switching the converter, using a regulator, between a normal operating mode and a reduced voltage operating mode in order to regulate the rotor voltage,
wherein in the normal operating mode the regulator operates the converter based on predetermined network parameters, and
wherein in the reduced voltage operating mode the regulator causes the converter to operate the generator with reduced excitation relative to the normal operating mode.

13. The method as claimed in claim 12, further comprising determining a voltage on the network side of the stator, and exciting the generator as a function of this voltage.

14. The method of claim 12, further comprising
regulating, in the reduced voltage operating mode, the rotor voltage at an adjustable low value lower than the value at which the rotor voltage is regulated in the normal operating mode.

15. The method of claim 14, further comprising
determining the low value as a function of the stator voltage.

16. The method as claimed in claim 15, wherein the converter comprises a generator-side inverter, and further comprising
varying the excitation of the generator-side inverter in order to regulate the rotor voltage.

17. The method of any of claims 12-16, wherein the converter comprises a network-side inverter and further comprising in the reduced voltage operating mode
operating the network-side inverter in an under-excited operating mode, in which the network-side inverter feeds a wattless component into the stator, to reduce the rotor voltage.

18. The method of claim 17, further comprising
supporting the network-side inverter with a compensation installation configured to feed a wattless component into the stator in the reduced voltage operating mode.

19. The method of claim 12, further comprising
measuring the rotor voltage; and
activating a protective device when a predetermined limit value is exceeded,
wherein the activating of the protective device reduces the rotor voltage below the predetermined limit value.

20. The method of claim 14, further comprising
determining the low value as a function of the network frequency.

21. The method of claim 12, further comprising
measuring the rotor voltage; and
performing a regulation method when a predetermined limit value is exceeded,
wherein the performing of the regulation method reduces the rotor voltage below the predetermined limit value.

* * * * *